United States Patent Office 3,733,324
Patented May 15, 1973

3,733,324
PYRROLIDINOCARBONYLMETHYL PIPERAZINO METHYL INDOLE
Claude P. Fauran, Michel J. Turin, and Guy M. Raynaud, Paris, and Bernard M. Pourrias, Meudon-La-Foret, France, assignors to Delalande S.A., Courbevoie, Hauts-de-Seine, France
No Drawing. Filed June 4, 1971, Ser. No. 150,224
Claims priority, application France, June 10, 1970, 7021223
Int. Cl. C07d 51/70
U.S. Cl. 260—268 BC                                      1 Claim

ABSTRACT OF THE DISCLOSURE
A compound of the formula

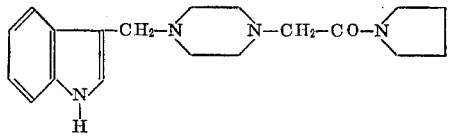

The compound is prepared by reacting indole with N-(pyrrolidinocarbonylmethyl) piperazine and trioxymethylene (paraformaldehyde).

The compound possesses anti-hypertensive properties.

---

The present invention has for its object a new derivative of N (aminocarbonylmethyl) piperazine, i.e. 1-(indol-3-yl methyl) 4-(pyrrolidinocarbonylmethyl) piperazine, its method of preparation and its application to therapeutics.

The new compound corresponds to the formula:

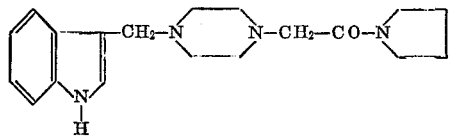

(I)

The method of the invention consists in causing to react simultaneously on indole whose formula is:

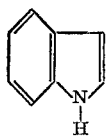

(II)

N (pyrrolidinocarbonylmethyl) piperazine whose formula is:

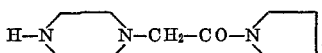

(III)

and trioxymethylene whose formula is:

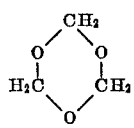

(IV)

According to a preferred embodiment of the method of the invention 100 ml. of acetic acid, 70 g. of indole and 15 g. of trioxymethylene are added to a solution of 79 g. of N (pyrrolidinocarbonylmethyl) piperazine in 600 ml. of dioxane. This mixture is stirred for 15 hours at 30° C. After elimination of the solvent 500 ml. of water are added and then an extraction by ethyl acetate is carried out. The aqueous solution is then neutralised by NaOH. The product precipitates, it is centrifuged, dried and recrystallised in ethanol at 96°.

Melting point _____° C__ 192
Yield _____percent__ 45

Empirical formula: $C_{19}H_{26}N_4O$.—Elementary analysis: Calculated (percent): C, 69.90; H, 8.03; N, 17.17. Obtained (percent): C, 69.69; H, 8.00; N, 17.02.

The compound of Formula I was tested on a laboratory animal and showed anti-hypertensive properties. These were observed in a rat kept awake and made hypertense by unilateral renal pressure followed by contralateral nephrectomy. The first effective dose administered orally of the substance studied is 37.5 mg./kg. which reduces by 20% the value of the systolic arterial pressure measured by electrosphygmorgraphy. With an oral dose of 75 mg./kg., the lowering of the arterial pressure is on average 32%.

Toxicity: The oral DL 50 of the substance studied is, in the mouse, 1100 mg./kg.

As is obvious from the preceding results, the difference between pharmacologically active doses and the lethal dose is large enough to allow the use of the Formula I compound in therapeutics.

It is recommended for the treatment of hypertension.

It will be administered in the form of tablets, pills, capsules and delayed action tablets dosed with 25 to 250 mg. of the active constituent, at the rate of 1 to 3 a day.

What we claim is:
1. 1°-1-(indol-3-yl methyl) 4-(pyrrolidinocarbonylmethyl) piperazine whose formula is:

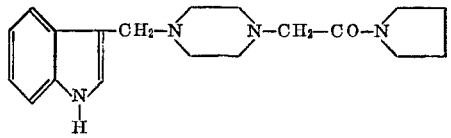

(I)

References Cited
UNITED STATES PATENTS
3,658,822   4/1972   Fauran et al. _____ 260—268 BC
3,188,313   6/1965   Archon _____ 260—268 BC
3,466,287   9/1969   Archon _____ 260—268 BC

OTHER REFERENCES
Fauran et al., Bull. Chemie Therap., 1969, No. 4, pp. 290–2.

DONALD G. DAUS, Primary Examiner

U.S. Cl. X.R.
260—268 H; 424—250

UNITED STATES PATENT OFFICE
CERTIFICATE OF CORRECTION

Patent No. 3,733,324  Dated May 15, 1973

Inventor(s) Claude P. Fauran, Michel J. Turin, Guy M. Raynaud and Bernard M. Pourrias It is certified that error appears in the above-identified patent and that said Letters Patent are hereby corrected as shown below:

Claim 1, line 1; change "1. 1°-1-(indol" to ---1. 1-(indol---.

Signed and sealed this 5th day of February 1974.

(SEAL)
Attest:

EDWARD M. FLETCHER, JR.  RENE D. TEGTMEYER
Attesting Officer  Acting Commissioner of Patents